United States Patent
Kozuka et al.

(10) Patent No.: US 11,352,048 B2
(45) Date of Patent: Jun. 7, 2022

(54) ROTATION DETECTION DEVICE

(71) Applicants: JTEKT CORPORATION, Osaka (JP); RENESAS ELECTRONICS CORPORATION, Tokyo (JP)

(72) Inventors: Kenichi Kozuka, Chita (JP); Masato Oda, Okazaki (JP); Tadashi Kawahara, Tokyo (JP); Masashi Oki, Tokyo (JP)

(73) Assignees: JTEKT CORPORATION, Osaka (JP); RENESAS ELECTRONICS CORPORATION, Tokyo (JP)

( * ) Notice: Subject to any disclaimer, the term of this patent is extended or adjusted under 35 U.S.C. 154(b) by 214 days.

(21) Appl. No.: 16/579,351

(22) Filed: Sep. 23, 2019

(65) Prior Publication Data

US 2020/0102001 A1 Apr. 2, 2020

(30) Foreign Application Priority Data

Sep. 28, 2018 (JP) .............................. JP2018-184159

(51) Int. Cl.
*B62D 5/04* (2006.01)
*B62D 1/16* (2006.01)

(52) U.S. Cl.
CPC .............. *B62D 5/0403* (2013.01); *B62D 1/16* (2013.01); *B62D 5/0409* (2013.01)

(58) Field of Classification Search
CPC ...... B62D 5/0403; B62D 1/16; B62D 5/0409; B62D 5/0475
See application file for complete search history.

(56) References Cited

U.S. PATENT DOCUMENTS

| | | | | |
|---|---|---|---|---|
| 4,875,539 A * | 10/1989 | Abukawa | ............... | B62D 5/046 180/446 |
| 6,502,024 B2 * | 12/2002 | Ishihara | ................. | B62D 5/046 180/414 |
| 8,148,937 B2 * | 4/2012 | Itoh | ......................... | H02P 21/06 318/809 |
| 8,651,227 B2 * | 2/2014 | Taniguchi | ............... | H02P 21/04 180/446 |
| 9,054,613 B2 * | 6/2015 | Hanada | ................. | H02P 29/662 |

(Continued)

FOREIGN PATENT DOCUMENTS

| CN | 104584423 A | 4/2015 |
|---|---|---|
| DE | 10 2016 205 634 A1 | 10/2016 |

(Continued)

OTHER PUBLICATIONS

Feb. 18, 2020 Extended Search Report issued in European Patent Application No. 19199539.8.

(Continued)

*Primary Examiner* — Jacob D Knutson
(74) *Attorney, Agent, or Firm* — Oliff PLC

(57) ABSTRACT

A rotation detection device includes a rotation detection circuit, a step-up power supply circuit, a step-down power supply circuit, a first power supply path, and a second power supply path. The rotation detection circuit is configured to detect a rotation number of a motor that generates a torque applied to a steering mechanism of a vehicle, based on an electric signal. The electric signal is generated according to a rotation angle of the motor that is acquired through an in-vehicle sensor.

4 Claims, 4 Drawing Sheets

(56) References Cited

U.S. PATENT DOCUMENTS

| | | | |
|---|---|---|---|
| 10,384,711 B2 * | 8/2019 | Kodera | B62D 5/003 |
| 2007/0068727 A1 * | 3/2007 | Miura | B62D 5/046 |
| | | | 180/446 |
| 2016/0200355 A1 | 7/2016 | Mori et al. | |
| 2016/0297471 A1 * | 10/2016 | Yamanaka | H02P 6/085 |
| 2020/0290670 A1 | 9/2020 | Iida | |

FOREIGN PATENT DOCUMENTS

| | | | | |
|---|---|---|---|---|
| JP | 2005029002 A | * | 2/2005 | B62D 5/0463 |
| JP | 2017-124710 A | | 7/2017 | |
| JP | 2017-196991 A | | 11/2017 | |
| WO | 2017-175381 A1 | | 10/2017 | |

OTHER PUBLICATIONS

Nov. 10, 2021 Office Action issued in Chinese Patent Application No. 201910927258.9.

* cited by examiner

ROTATION DETECTION DEVICE

CROSS REFERENCE TO RELATED APPLICATIONS

This application claims priority from Japanese Patent Application No. 2018-184159 filed on Sep. 28, 2018, the entire contents of which are incorporated herein by reference.

BACKGROUND OF THE INVENTION

Field of the Invention

The present invention relates to a rotation detection device.

Description of Related Art

In a related art, there is an electric power steering device for a vehicle (hereinafter, referred to as "EPS") that generates an assist torque with a motor. An EPS control device controls the torque generated with the motor in accordance with a steering torque detected through a torque sensor. The control device energizes a coil of the motor in accordance with a rotation angle of the motor detected through a rotation angle sensor. Further, the control device calculates a steering angle, which is a rotation angle of a steering shaft, based on the rotation angle and a rotation number of the motor detected through the rotation angle sensor. The steering angle is used for control of the EPS or used for control of another in-vehicle system.

Here, in the EPS, even in a case where a power switch of the vehicle is turned off and an assist function is stopped, the steering shaft may be rotated by some external force. Therefore, in a case where a configuration in which the steering angle is calculated based on the rotation angle and the rotation number of the motor is adopted as the control device, it is necessary to monitor a rotation state of the motor even while the power switch is turned off. However, in this case, from the viewpoint of suppressing power consumption of a battery mounted on the vehicle, it is required to reduce the power consumption while the power switch is turned off.

Therefore, in a control device of Patent Literature 1, the rotation number of the motor is detected by intermittently operating the rotation angle sensor while the power switch is turned off. The control device switches an intermittent cycle in accordance with the rotation state of the motor. As a result, it is possible to reduce the power consumption of the battery while the power switch is turned off. When the power switch is turned on, the control device calculates the steering angle in consideration of the rotation number detected while the power switch is turned off

[Patent Literature 1] JP-A-2017-124710

As described above, the control device of Patent Literature 1 consumes power of the battery to detect the rotation number of the motor. Therefore, when a voltage of the battery is lowered, normal operation of the control device may be inhibited, and thus the control device may not be capable of properly detecting the rotation number of the motor.

SUMMARY

One or more embodiments provide a rotation detection device whose function of detecting rotation of a motor is maintained even in a case where a power supply voltage of a vehicle is lowered.

In an aspect (1), one or more embodiments provide a rotation detection device including a rotation detection circuit, a step-up power supply circuit, a step-down power supply circuit, a first power supply path, and a second power supply path. The rotation detection circuit is configured to detect a rotation number of a motor that generates a torque applied to a steering mechanism of a vehicle, based on an electric signal. The electric signal is generated according to a rotation angle of the motor that is acquired through an in-vehicle sensor. The step-up power supply circuit is configured to perform a step-up operation so that a voltage of a DC power supply mounted in the vehicle is maintained at a normal level, when a vehicle power supply is turned on and the voltage of the DC power supply is lowered below the normal level. The step-down power supply circuit is connected to the DC power supply and is configured to perform a step-down operation to a suitable voltage for operation of the rotation detection circuit. The first power supply path connects the DC power supply and the step-down power supply circuit. The second power supply path connects the step-up power supply circuit and the step-down power supply circuit. Power is supplied to the step-down power supply circuit via the first power supply path, when the vehicle power supply is turned on and the voltage of the DC power supply is maintained at the normal level. The power is supplied to the step-down power supply circuit via the second power supply path, when the vehicle power supply is turned on and the voltage of the DC power supply is lowered below the normal level.

According to the aspect (1), in a case where the vehicle power supply is turned on, when the voltage of the DC power supply is lowered below the normal level, a power supply path to the step-down power supply circuit is switched from the first power supply path to the second power supply path. Therefore, although the voltage of the DC power supply is lowered, the voltage stepped up to the constant voltage by the step-up power supply circuit is supplied to the step-down power supply circuit. The step-down power supply circuit steps down the voltage stepped up by the step-up power supply circuit to a voltage suitable for operation of the rotation detection circuit, and supplies the voltage stepped down to the rotation detection circuit. Therefore, even in a case where the voltage of the DC power supply is lowered, the function of detecting rotation of the motor is maintained.

In an aspect (2), the rotation detection device may further include a voltage detection circuit configured to detect the voltage of the DC power supply, a switch provided in the second power supply path and configured to open and close the second power supply path, and a switch control circuit configured to control opening and closing of the switch. The switch control circuit may maintain the switch in an open state, when the vehicle power supply is turned on and the voltage of the DC power supply detected through the voltage detection circuit is equal to or higher than a threshold voltage set based on an operable voltage of the step-down power supply circuit. The switch control circuit may switch the switch from the open state to a closed state, when the vehicle power supply is turned on and the voltage of the DC power supply is lower than the threshold voltage.

According to the aspect (2), in a case where the switch is in the open state, power is supplied to the step-down power supply circuit through the first power supply path. In a case where the switch is in the close state, power is supplied to the step-down power supply circuit through the second power supply path. In this way, by opening and closing the switch in accordance with the voltage of the DC power supply, the power supply path to the step-down power supply circuit can be switched between the first power supply path and the second power supply path.

In an aspect (3), the first power supply path and the second power supply path may be integrated at a step-down power supply circuit side. The rotation detection device may include a first diode whose anode is provided on a DC power supply side and whose cathode is provided on the step-down power supply circuit side, in the first power supply path. The rotation detection device may include a second diode whose anode in provided on a step-up power supply circuit side and whose cathode is provided on the step-down power supply circuit side, in the second power supply path.

According to the aspect (3), in a case where the vehicle power supply is turned on, when the voltage of the DC power supply is maintained above the voltage generated by the step-up power supply circuit, power is supplied to the step-down power supply circuit through the first power supply path. That is, the voltage of the DC power supply is supplied to the step-down power supply circuit through the first diode. At this time, the voltage of the DC power supply is higher than the voltage generated by the step-up power supply circuit. Therefore, although the power from the DC power supply supplied through the first power supply path is to flow through the second power supply path toward the step-up power supply circuit side (the DC power supply side), the current flow is regulated by the second diode.

In a case where the vehicle power supply is turned on, when the voltage of the DC power supply is lowered below the voltage generated by the step-up power supply circuit, the power supply path to the step-down power supply circuit is switched from the first power supply path to the second power supply path. As a result, the voltage stepped up by the step-up power supply circuit is supplied to the step-down power supply circuit through the second diode. At this time, the voltage generated by the step-up power supply circuit is higher than the voltage of the DC power supply. Therefore, although the power from the step-up power supply circuit supplied through the second power supply path is to flow through the first power supply path toward the DC power supply side, the current flow is regulated by the first diode.

Therefore, it is possible to cope with decrease in the voltage of the DC power supply by simply providing diodes in the first power supply path and the second power supply path, respectively. The configuration of the rotation detection device is not complicated either.

In an aspect (4), the rotation detection device may include a first capacitor for instantaneous disconnection backup in the first power supply path and between the DC power supply and the step-down power supply circuit. The rotation detection device may include a second capacitor for instantaneous disconnection backup in the second power supply path and between the DC power supply and the step-up power supply circuit.

According to the aspect (4), in a case where power is supplied to the step-down power supply circuit through the first power supply path, when an instantaneous disconnection occurs such that the voltage of the DC power supply is interrupted temporarily, an electric charge stored in the first capacitor is supplied to the step-down power supply circuit. The step-down power supply circuit operates due to the electric charge supplied from the first capacitor. Therefore, operation of the rotation detection circuit can be maintained temporarily. In a case where power is supplied to the step-down power supply circuit through the second power supply path, when an instantaneous disconnection occurs such that the voltage of the DC power supply is interrupted temporarily, an electric charge stored in the second capacitor is supplied to the step-up power supply circuit. The step-up power supply circuit operates due to the electric charge supplied from the second capacitor. Therefore, operation of the rotation detection circuit can be maintained temporarily.

In an aspect (5), the step-up power supply circuit may be configured to stop operation when the vehicle power supply is turned off, and configured to operate so as to generate a constant voltage by switching the step-up operation and the step-down operation according to the voltage of the DC power supply when the vehicle power supply is turned on. The rotation detection device may include another step-down power supply circuit configured to stop operation when the vehicle power supply is turned off, and configured to operate so as to lowered a voltage generated by the step-up power supply circuit to the suitable voltage for another power supply target except for the rotation detection circuit when the vehicle power supply is turned on. The voltage generated by the step-up power supply circuit may be supplied to the other step-down power supply circuit through a third power supply path other than the first power supply path and the second power supply path when the vehicle power supply is turned on.

According to the aspect (5), in a case where the vehicle power supply is turned off, it is not necessary to operate the step-up power supply circuit. Therefore, it is possible to suppress the power consumption of the DC power supply in a case where the vehicle power supply is turned off.

According to one or more embodiments, a function of detecting rotation of a motor is maintained even in a case where a power supply voltage of a vehicle is lowered.

DETAILED DESCRIPTION

First Embodiment

Hereinafter, a first embodiment will be described with an angle detection device embodied as an electronic control unit (ECU) of an electric power steering device (hereinafter, referred to as "EPS").

<Schematic Configuration of EPS>

Figure 1:
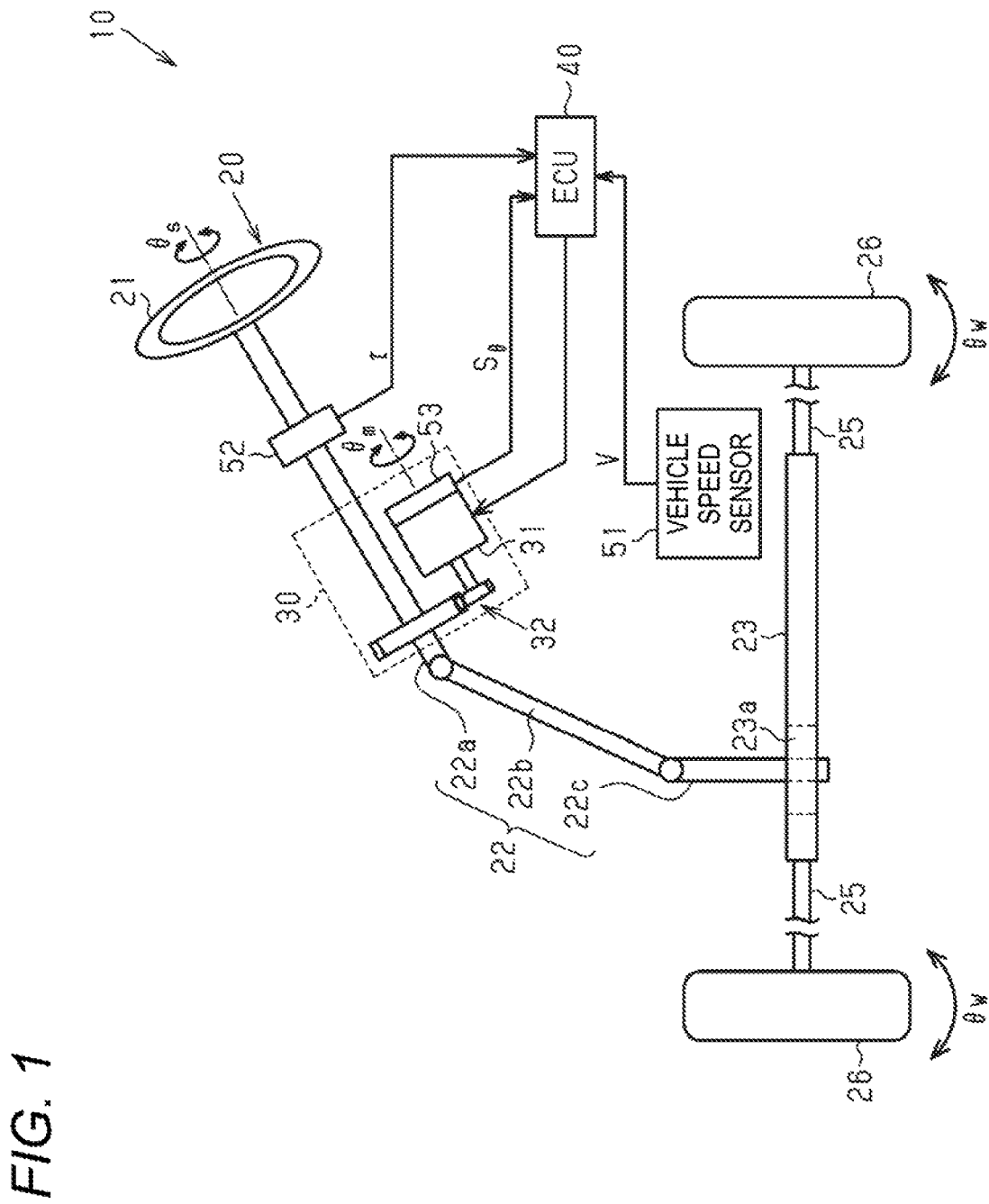
FIG. 1 is a schematic diagram of an electric power steering device as a control target of a control device provided with a first embodiment of an angle detection device.

As shown in FIG. 1, the EPS 10 includes a steering mechanism 20 that steers steered wheels 26, 26 based on steering operation of a driver, a steering assist mechanism 30 that assists the steering operation of the driver, and an electronic control circuit (ECU) 40 that controls operation of the steering assist mechanism 30.

The steering mechanism 20 includes a steering wheel 21 operated by the driver, and a steering shaft 22 that rotates integrally with the steering wheel 21. The steering shaft 22 includes a column shaft 22a connected to the steering wheel 21, an intermediate shaft 22b connected to a lower end portion of the column shaft 22a, and a pinion shaft 22c connected to a lower end portion of the intermediate shaft 22b. A lower end portion of the pinion shaft 22c meshes with rack teeth 23a provided on a rack shaft 23 extending in a direction intersecting the pinion shaft 22c. Therefore, rotation of the steering shaft 22 is converted into a reciprocating linear motion of the rack shaft 23 through meshing of the pinion shaft 22c and the rack teeth 23a of the rack shaft 23. By transmitting the reciprocating linear motion to the left and right steered wheels 26, 26 via a tie rod 25 connected to both ends of the rack shaft 23, a steering angle $\theta_w$ of the steered wheels 26, 26 is changed.

The steering assist mechanism 30 includes a motor 31 as a generation source of a steering assist force (assist force). For example, a three-phase brushless motor is employed as the motor 31. The motor 31 is connected to the column shaft 22a via a deceleration mechanism 32. The deceleration mechanism 32 decelerates rotation of the motor 31, and transmits the decelerated rotation force to the column shaft 22a. That is, the steering operation of the driver is assisted by applying the torque of the motor 31 to the steering shaft 22 as the steering assist force.

The ECU 40 acquires detection results of various sensors provided in the vehicle as information (properties) indicating request of the driver, a running state, and a steering state, and controls the motor 31 in accordance with the acquired various information. Examples of the various sensors include a vehicle speed sensor 51, a torque sensor 52, and a rotation angle sensor 53. The vehicle speed sensor 51 detects a vehicle speed V. The torque sensor 52 is provided, for example, on the column shaft 22a. The torque sensor 52 detects a steering torque τ applied to the steering shaft 22. The rotation angle sensor 53 is provided in the motor 31. The rotation angle sensor 53 generates an electric signal $S_\theta$ corresponding to a rotation angle $\theta_m$ of the motor 31.

The ECU 40 detects the rotation angle $\theta_m$ of the motor 31 based on the electric signal $S_\theta$ generated by the rotation angle sensor 53, and performs vector control of the motor 31 using the detected rotation angle $\theta_m$. The ECU 40 calculates a steering angle $\theta_s$ as a rotation angle of the steering wheel 21 based on the rotation angle $\theta_m$ of the motor 31. The ECU 40 calculates a target assist torque based on the steering torque τ, the vehicle speed V, and the steering angle $\theta_s$, and supplies drive power, which is for generating the calculated target assist torque to the steering assist mechanism 30, to the motor 31.

<Configuration of ECU>

Figure 2:
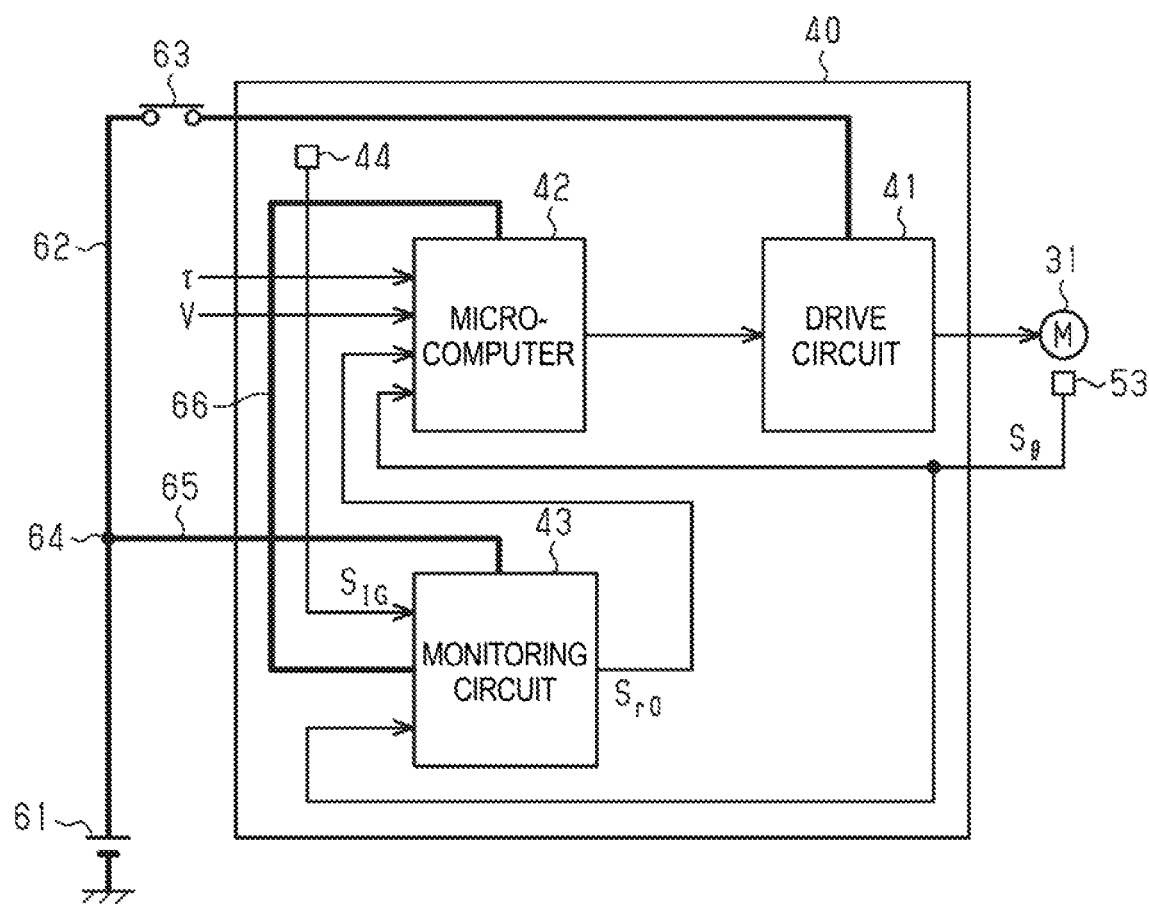
FIG. 2 is a block diagram of a control device provided with the angle detection device according to the first embodiment.

As shown in FIG. 2, the ECU 40 includes a drive circuit (inverter) 41, a microcomputer 42, a monitoring circuit 43, and a power supply detection unit 44.

Power is supplied to the drive circuit 41, the microcomputer 42, and the monitoring circuit 43 from a DC power supply 61 such as a battery mounted on the vehicle. The drive circuit 41 and the DC power supply 61 (precisely, a plus terminal thereof) are connected to each other by a first feeder 62. The first feeder 62 is provided with a power switch 63 of the vehicle such as an ignition switch. The power switch 63 is operated to operate a drive source for traveling the vehicle such as an engine. In the first feeder 62, a first connection point 64 is set between the DC power supply 61 and the power switch 63. The first connection point 64 and the monitoring circuit 43 are connected to each other by a second feeder 65. The monitoring circuit 43 and the microcomputer 42 are connected to each other by a third feeder 66.

When the power switch 63 is turned on, power of the DC power supply 61 is supplied to the drive circuit 41 via the first feeder 62. Power of the DC power supply 61 is constantly supplied to the monitoring circuit 43 via the second feeder 65. When the power switch 63 is turned on, the monitoring circuit 43 supplies operation power to the microcomputer 42 via the third feeder 66. The monitoring circuit 43 also supplies operation power to the rotation angle sensor 53 via a feeder (not shown).

The drive circuit 41 is a PWM inverter in which three legs respectively corresponding to three phases (U, V, W) are connected in parallel, with switching elements such as two field-effect transistors (FETs) connected in series being the legs serving as basic units. The drive circuit 41 converts the DC power supplied from the DC power supply 61 into three-phase AC power based on a control signal generated by the microcomputer 42. The three-phase AC power is supplied to the motor 31 (precisely, a motor coil of each phase) via a power supply path of each phase (not shown).

The microcomputer 42 calculates a basic component of the target assist torque to be generated in the motor 31 based on the steering torque τ and the vehicle speed V. The microcomputer 42 calculates the rotation angle $\theta_m$ of the motor 31 based on the electric signal $S_\theta$ generated by the rotation angle sensor 53, and calculates the steering angle $\theta_s$ based on the calculated rotation angle $\theta_m$. The microcomputer 42 calculates various compensation components as part of compensation control with respect to the basic component of the target assist torque based on the calculated steering angle $\theta_s$. These compensation components include, for example, a steering return control component for returning the steering wheel 21 to a neutral position. The microcomputer 42 calculates a current command value corresponding to a final target assist torque value obtained by adding the basic component and the various compensation components of the target assist torque. The microcomputer 42 generates a control signal for the drive circuit 41 by executing current feedback control that causes an actual current value supplied to the motor 31 to follow the current command value. This control signal defines duty ratios of the switching elements of the drive circuit 41. The duty ratios refers to ratios of ON times of the switching elements to a pulse cycle.

The actual current value supplied to the motor 31 is detected via a current sensor (not shown) provided in the power supply paths between the drive circuit 41 and the motor 31. When a current corresponding to the control signal is supplied to the motor 31 through the drive circuit 41, the motor 31 generates a torque corresponding to the target assist torque. The torque of the motor 31 is applied to a steering mechanism (here, the column shaft 22a) of the vehicle via the deceleration mechanism 32 as an assist force that assists steering of the driver.

The monitoring circuit 43 calculates the rotation number of the motor 31 based on the electric signal $S_\theta$ generated by the rotation angle sensor 53. The monitoring circuit 43 is provided as an application specific integrated circuit (ASIC). The monitoring circuit 43 will be described in detail later.

The power supply detection unit 44 detects whether the power switch 63 is in the on state (vehicle power supply on) or the off state (vehicle power supply off). The power supply detection unit 44 may detect the state of the power switch 63 based on a position of the power switch 63 (the vehicle power supply), or may detect the state of the power switch 63 based on a voltage between the power switch 63 in the first feeder 62 and the drive circuit 41. The power supply detection unit 44 generates an electric signal $S_{IG}$ indicating whether the power switch 63 is turned on or off <Detection of Steering Angle>

Next, detection of the steering angle θ, will be described in detail.

As the rotation angle sensor 53, for example, a magnetoresistive effect sensor (MR sensor), which is a type of magnetic sensor, is adopted. The MR sensor generates the electric signal $S_θ$ corresponding to a magnetic field direction of a bias magnet having a pair of magnetic poles (an N pole and an S pole) provided at an end portion of an output shaft of the motor 31. The electric signal $S_θ$ includes a sine signal (sin signal) that changes in a sin waveform with respect to the rotation angle $θ_m$ of the motor 31, and a cosine signal (cos signal) that changes in a cosine waveform with respect to the rotation angle $θ_m$ of the motor 31. The sine signal and the cosine signal are signals each with a cycle in which the motor 31 rotates by an angle corresponding to one magnetic pole pair of the bias magnet (here, 360°) as one cycle. The microcomputer 42 detects the rotation angle $θ_m$ of the motor 31 by calculating an arctangent value of the sine signal and the cosine signal.

However, the rotation angle $θ_m$ of the motor 31 calculated based on the electric signal $S_θ$ (sine signal and cosine signal) generated by the rotation angle sensor 53 is a relative angle. On the other hand, for example, the steering angle $θ_s$ used for steering return control is an absolute angle. Therefore, the microcomputer 42 calculates the steering angle $θ_s$ as an absolute value by applying the rotation angle $θ_m$ (electrical angle) of the motor 31 to the following equation (A), for example.

$$\text{Steering angle (absolute angle) } θ_s=(θ_m+N×360°)/Gr \quad (A)$$

Here, "N" is the rotation number (the number of cycles) in a case where one cycle of the rotation angle $θ_m$, that is, a change from 0° to 360° in the electrical angle is defined as one rotation. The rotation number N is acquired through the monitoring circuit 43. "Gr" is a gear ratio (deceleration ratio) of the deceleration mechanism 32 that decelerates rotation of the motor 31. Information indicating the gear ratio Gr is stored in a storage device (not shown) of the microcomputer 42.

Here, when the power switch 63 is turned off, the microcomputer 42 stores the rotation angle $θ_m$ of the motor 31 and the rotation number N acquired through the monitoring circuit 43 immediately before in a storage device (not shown). This is to calculate an accurate steering angle $θ_s$ when the power switch 63 is turned on again.

However, the steering wheel 21 may be operated for some reason while the power switch 63 is turned off. In this case, since the rotation angle $θ_m$ and the rotation number N of the motor 31 stored in the storage device immediately before the power supply to the microcomputer 42 is stopped are different from the actual rotation angle $θ_m$ and rotation number N, an accurate steering angle $θ_s$ may not be obtained when the power switch 63 is turned on again. Therefore, the rotation number N of the motor 31 is preferably monitored even while the power switch 63 is turned off.

Therefore, in the present embodiment, even while the power switch 63 is turned off, since power is continuously supplied to the rotation angle sensor 53 and the monitoring circuit 43, the rotational number N of the motor 31 is continuously counted. Incidentally, while the power switch 63 is turned off, power supply from the monitoring circuit 43 to the microcomputer 42 is stopped. This is to suppress the power consumption of the DC power supply 61 while the power switch 63 is turned off. A specific configuration of the monitoring circuit 43 is as follows.

<Monitoring Circuit>

Figure 3:
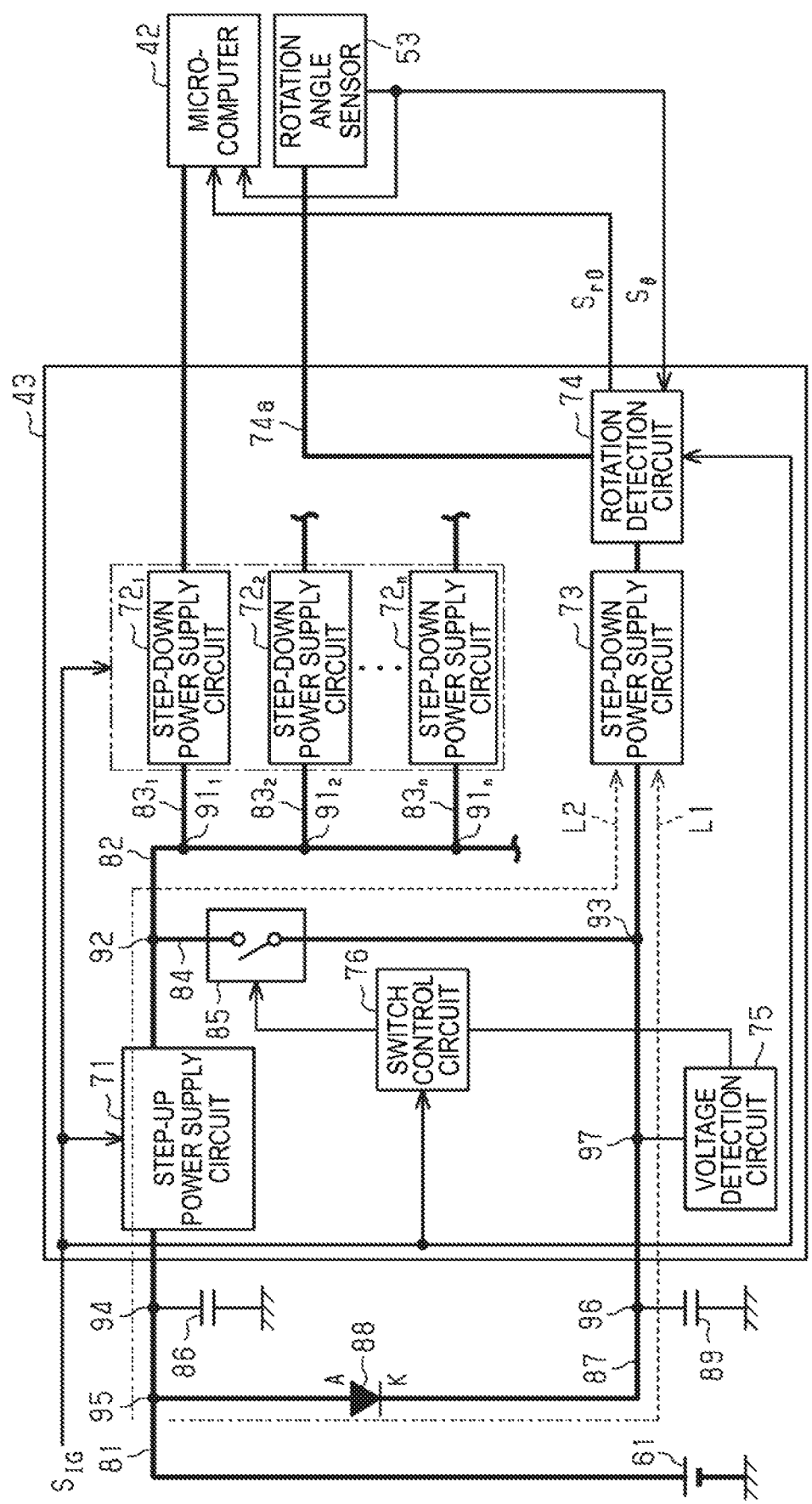
FIG. 3 is a block diagram of a monitoring circuit according to the first embodiment.

As shown in FIG. 3, the monitoring circuit 43 includes a step-up/step-down power supply circuit 71 (step-up power supply circuit), step-down power supply circuits $72_1$ to $72_n$, a step-down power supply circuit 73, a rotation detection circuit 74, a voltage detection circuit 75, and a switch control circuit 76. Here, the subscripts "1 to n" of the reference signs "$72_1$ to $72_n$" correspond to the number of step-down power supply circuits. Here, "n" is a natural number.

The DC power supply 61 (plus terminal) and the step-up/step-down power supply circuit 71 are connected to each other by a feeder 81 (the second feeder 65).

The step-up/step-down power supply circuit 71 and the step-down power supply circuits $72_1$ to $72_n$ are connected to each other via a feeder 82. Connection points $91_1$ to $91_n$ are set on the feeder 82. The connection point $91_1$ and the step-down power supply circuit $72_1$ are connected to each other by a feeder $83_1$. The connection point $91_2$ and the step-down power supply circuit $72_2$ are connected to each other by a feeder $83_2$. The connection point $91_n$ and the step-down power supply circuit $72_n$ are connected to each other by a feeder $83_n$.

On the feeder 82, a connection point 92 is set between the step-up/step-down power supply circuit 71 and the connection point $91_1$. The connection point 92 and the step-down power supply circuit 73 are connected to each other by a feeder 84.

A switch 85 is provided on the feeder 84. The switch 85 opens and closes the feeder 84. On the feeder 84, a connection point 93 is set between the switch 85 and the step-down power supply circuit 73.

Here, in the ECU 40, the connection points 94 and 95 are set on the feeder 81 in a portion provided outside the monitoring circuit 43. A capacitor 86 for instantaneous disconnection backup is provided between the connection point 94 and the ground. The connection point 95 and the connection point 93 of the feed line 84 are connected to each other by a feeder 87. In the ECU 40, a diode 88 and a connection point 96 are provided in a portion provided outside the monitoring circuit 43 on the feeder 87. A capacitor 89 for instantaneous disconnection backup is provided between the connection point 96 and the ground. The diode 88 is provided between the connection point 95 and the connection point 96 on the feeder 87. An anode (A) of the diode 88 is connected to the connection point 95 side (plus terminal side of the DC power supply 61), and a cathode (K) of the diode 88 is connected to the connection point 96 side. In the ECU 40, a connection point 97 is set in a portion provided inside the monitoring circuit 43 on the feeder 87. The voltage detection circuit 75 is connected to the connection point 97.

The voltage detection circuit 75 detects a voltage of the feeder 87. Since the feeder 87 is connected to the DC power supply 61 via the feeder 81, the voltage of the feeder 87 can be regarded as the voltage of the DC power supply 61.

The switch control circuit 76 detects lowering of the voltage of the DC power supply 61 based on the voltage of the feeder 87 detected by the voltage detection circuit 75. As shown in the following formula (B1), when a voltage $V_{87}$ of the feeder 87 is equal to or higher than a threshold voltage $V_{th}$, the switch control circuit 76 regards that the voltage of the DC power supply 61 is at the normal level and maintains the switch 85 in the off state. As shown in the following formula (B2), when the voltage $V_{87}$ of the feeder 87 is lower than the threshold voltage $V_{th}$, the switch control circuit 76 regards that the voltage of the DC power supply 61 is lower than the normal level and switches the switch 85 from OFF to ON.

The threshold voltage $V_{th}$ is set based on, for example, an operable voltage of the step-down power supply circuit 73 dedicated to the rotation detection circuit 74, which will be described later, or a minimum required voltage for the rotation detection circuit 74 to operate (minimum operating voltage).

$$V_{87} \geq V_{th} \tag{B1}$$

$$V_{87} < V_{th} \tag{B2}$$

The switch control circuit 76 takes in the electric signal $S_{IG}$ generated by the power supply detection unit 44, and recognizes whether the power switch 63 is turned on or off based on the received electric signal $S_{IG}$. When the power switch 63 is switched from ON to OFF, the switch control circuit 76 switches the switch 85 from ON to OFF regardless of the voltage of the feeder 87.

The step-up/step-down power supply circuit 71 generates a constant voltage by switching between step-up operation and step-down operation in accordance with the voltage of the DC power supply 61. The constant voltage is a value lower than the voltage of the normal level of the DC power supply 61 and higher than the voltage suitable for operation of the power supply targets of the step-down power supply circuits $72_1$ to $72_n$ and the step-down power supply circuit 73 (such as the microcomputer 42 and the rotation angle sensor 53). The step-up/step-down power supply circuit 71 performs the step-down operation in a case where the DC power supply 61 is fully charged (in a case where the voltage of the DC power supply 61 is not lowered but is maintained at the normal level). The step-up/step-down power supply circuit 71 performs the step-up operation in a case where due to discharge of the DC power supply 61, the voltage of the DC power supply 61 is lowered below the constant voltage that is a target value. As a result, the constant voltage is generated.

Incidentally, in order to stably operate the electric circuit, a power supply for supplying a stable voltage to the electric circuit is required, and the voltage value of the DC power supply 61 (here, the battery), which is the power supply of the vehicle, varies depending on the load condition and various environmental factors which are constantly changing. Therefore, it is preferable to generate a constant voltage by the step-up/step-down power supply circuit 71. The step-up/step-down power supply circuit 71 takes in the electric signal $S_{IG}$ generated by the power supply detection unit 44. The step-up/step-down power supply circuit 71 operates when the electric signal $S_{IG}$ indicates the ON state of the power switch 63, and stops the operation when the electric signal $S_{IG}$ indicates the OFF state of the power switch 63.

The step-down power supply circuits $72_1$ to $72_n$ convert the power supplied from the step-up/step-down power supply circuit 71 into power suitable for the operation of the power supply target provided outside the monitoring circuit 43. The power supply target of the monitoring circuit 43 is determined by the specifications of the EPS 10 or the ECU 40. Examples of the power supply target of the monitoring circuit 43 include the microcomputer 42, the torque sensor 52, and a controller area network (CAN) transceiver (not shown). The CAN transceiver is a communication device for transmitting and receiving electric signals to and from a plurality of in-vehicle ECUs via a CAN which is one of in-vehicle network communication standards.

For example, the step-down power supply circuit $72_1$ reduces the voltage generated by the step-up/step-down power supply circuit 71 to a voltage suitable for operation of the microcomputer 42. The step-down power supply circuit $72_2$ reduces the voltage generated by the step-up/step-down power supply circuit 71 to a voltage suitable for operation of the torque sensor 52. Similarly, the step-down power supply circuit $72_n$ decreases the voltage generated by the step-up/step-down power supply circuit 71 to a voltage suitable for operation of the CAN transceiver. Incidentally, although the rotation angle sensor 53 is also a power supply target of the monitoring circuit 43, operation power is supplied from the rotation detection circuit 74 to the rotation angle sensor 53 via a feeder 74a.

The step-down power supply circuits $72_1$ to $72_n$ take in the electric signal $S_{IG}$ generated by the power supply detection unit 44. The step-down power supply circuits $72_1$ to $72_n$ operate when the electric signal $S_{IG}$ indicates the ON state of the power switch 63, and stop the operation when the electric signal $S_{IG}$ indicates the OFF state of the power switch 63.

The step-down power supply circuit 73 converts the power supplied from the DC power supply 61 or the power supplied from the step-up/step-down power supply circuit 71 to power suitable for operation of the rotation detection circuit 74. Specifically, in a case where the switch 85 is turned off, the step-down power supply circuit 73 steps down the voltage of the DC power supply 61 to a voltage suitable for operation of the rotation detection circuit 74. In a case where the switch 85 is turned on, the step-down power supply circuit 73 steps down the voltage generated by the step-up/step-down power supply circuit 71 to a voltage suitable for operation of the rotation detection circuit 74.

Here, the case where the switch 85 is turned on refers to a case where the voltage of the DC power supply 61 is lowered to a value lower than the threshold voltage $V_{th}$. Therefore, the voltage of the feeder 87 is lower than the voltage value generated by the step-up/step-down power supply circuit 71. Therefore, the voltage generated by the step-up/step-down power supply circuit 71 is supplied to the step-down power supply circuit 73 without the power of the DC power supply 61 being supplied via the feeder 87.

The rotation detection circuit 74 takes in the sine signal and the cosine signal, which are the electric signal $S_\theta$ generated by the rotation angle sensor 53, at a predetermined sampling cycle, and calculates the rotation direction and the rotation number N of the motor 31 based on the acquired sine signal and cosine signal. The rotation detection circuit 74 generates a rotation detection signal $S_{ro}$ including the rotation number N of the motor 31.

The rotation detection circuit 74 detects the rotation direction of the motor 31 as follows. That is, the rotation detection circuit 74 plots coordinates ($\cos \theta_m$, $\sin \theta_m$), which are a set of values of the sine signal and the cosine signal, in a rectangular coordinate system of $\cos \theta_m$ and $\sin \theta_m$, and detects the rotation direction of the motor 31 based on transition of a quadrant in which the plotted coordinates are located. Incidentally, the rotation detection circuit 74 determines the quadrant in which the plotted coordinates are located based on positive or negative of the values of $\sin \theta_m$ and $\cos \theta_m$. When the coordinates transit from a first quadrant to a second quadrant, the rotation detection circuit 74 determines that the rotation direction of the motor 31 is a positive direction. When the coordinates transit from the first quadrant to a fourth quadrant, the rotation detection circuit 74 determines that the rotation direction of the motor 31 is a reverse direction.

The rotation detection circuit 74 detects the rotation number N of the motor 31 as follows. That is, the rotation detection circuit 74 includes a counter. The rotation detection circuit 74 increases or decreases a count value by a constant value (for example, a positive natural number such as 1 and 2) each time the quadrant in which the coordinates (cos $\theta_m$, sin $\theta_m$), which are a set of values of the sine signal and the cosine signal, are located switches. When the rotation direction of the motor 31 is the positive direction, the rotation detection circuit 74 increases the count value by the constant value each time the coordinates transit by one quadrant. When the rotation direction of the motor 31 is the reverse direction, the rotation detection circuit 74 decreases the count value by the constant value each time the coordinates transit by one quadrant. The rotation detection circuit 74 detects the rotation number N of the motor 31 based on the count value.

The rotation detection circuit 74 generates the rotation detection signal $S_{rO}$ including the rotation number N of the motor 31, and transmits the generated rotation detection signal $S_{rO}$ to the microcomputer 42.

Incidentally, the rotation detection circuit 74 may switch a sampling interval for sampling the electric signal $S_\theta$ according to the state of the power switch 63. In this case, the rotation detection circuit 74 takes in the electric signal $S_{IG}$ generated by the power supply detection unit 44, and determines whether the power switch 63 is turned on or off based on the received electric signal $S_{IG}$. The rotation detection circuit 74 takes in the electric signal $S_\theta$ generated by the rotation angle sensor 53 at a first sampling interval during a period in which the power switch 63 is turned off. When the power switch 63 is switched from OFF to ON, the rotation detection circuit 74 switches the sampling interval of the electric signal $S_\theta$ generated by the rotation angle sensor 53 from the first sampling interval to a second sampling interval.

Here, the second sampling interval is shorter than the first sampling interval. This is because that when the power switch 63 is turned on, a level of demand for reducing the power consumption is lower than when the power switch 63 is turned off. For example, in a case of a gasoline vehicle, when the engine is operating, power generated by an alternator is charged to the DC power supply 61. Therefore, the level of demand for reducing the power consumption is lower than in a case where the engine is stopped.

Operation of the microcomputer when the vehicle power supply is turned on is as follows.

When the power switch 63 is turned on, the operation power is supplied to the microcomputer 42 through the step-down power supply circuit $72_1$. As a result, the microcomputer 42 starts to operate. When the power switch 63 is turned on, the microcomputer 42 calculates the steering angle $\theta_s$ as an absolute value in consideration of the rotation number N of the motor 31 during the period in which the power switch 63 is turned off. If the rotation number N (count value) while the power switch 63 is turned off is known, the rotation angle $\theta_m$ since the power switch 63 is turned off last time until the current power switch 63 is turned on this time is known. When the power switch 63 is turned on again after the power switch 63 is turned off, the microcomputer 42 detects the current rotation angle $\theta_m$ by adding a rotation angle (change angle) while the power switch 63 is turned off to the rotation angle $\theta_m$ (relative angle) stored when the previous power switch 63 is turned off. The microcomputer 42 calculates the steering angle (absolute angle) by using the current rotation angle $\theta_m$. Then, the microcomputer 42 controls the power supply to the motor 31 using the current rotation angle $\theta_m$ of the motor 31. The microcomputer 42 executes compensation control such as steering return control by using the steering angle $\theta_s$.

<Function of First Embodiment>

Next, a function of the first embodiment will be described. Here, the power switch 63 is turned on.

First, in a case where the voltage of the DC power supply 61 is not lowered (in a case where the voltage of the DC power supply 61 is at the normal level), the switch 85 is maintained in the off state. Therefore, power is supplied to the step-down power supply circuit 73 through a first power supply path L1 indicated by a dashed arrow in FIG. 3. That is, the voltage of the DC power supply 61 is supplied to the step-down power supply circuit 73 via a part of the feeder 81 and the feeder 87. The step-down power supply circuit 73 steps down the voltage supplied from the DC power supply 61 to a voltage suitable for operation of the rotation detection circuit 74, and supplies the voltage stepped down to the rotation detection circuit 74. The rotation detection circuit 74 operates by being supplied with the voltage generated by the step-down power supply circuit 73.

Next, in a case where the voltage of the DC power supply 61 is lowered to a level below the normal level, the switch 85 is switched from OFF to ON. Therefore, power is supplied to the step-down power supply circuit 73 through a second power supply path L2 indicated by a dashed arrow in FIG. 3. That is, the voltage of the DC power supply 61 is supplied to the step-down power supply circuit 73 via the feeder 81, the step-up/step-down power supply circuit 71, the feeder 84, and a part of the feeder 87 (a part on the step-down power supply circuit 73 side with respect to the connection point 93).

Here, although the voltage of the DC power supply 61 is in a lowered state, the voltage of the DC power supply 61 is stepped up to the constant voltage by the step-up/step-down power supply circuit 71. The constant voltage is a value equal to or higher than the voltage required for operation of the rotation detection circuit 74. When the voltage generated by the step-up/step-down power supply circuit 71 is supplied to the step-down power supply circuit 73, the step-down power supply circuit 73 operates similarly as in the case where the voltage of the DC power supply 61 is not lowered. That is, the voltage generated by the step-up/step-down power supply circuit 71 is stepped down to the voltage suitable for operation of the rotation detection circuit 74 by the step-down power supply circuit 73. The rotation detection circuit 74 operates by being supplied with the voltage generated by the step-down power supply circuit 73.

Incidentally, since the voltage of the DC power supply 61 is now in the lowered state, the voltage generated by the step-up/step-down power supply circuit 71 is higher than the voltage of the DC power supply 61. That is, a voltage at the connection point 93 on the cathode side of the diode 88 is higher than a voltage at the connection point 95 on the anode side of the diode 88. Therefore, a current flows from the connection point 93 as a starting point into the connection point 95 and thus the DC power supply 61, whereas this current is prevented from flowing in by the diode 88.

Here, the power supply from the DC power supply 61 to the step-up/step-down power supply circuit 71 and the power supply from the DC power supply 61 to the step-down power supply circuit 73 may be instantaneously stopped (hereinafter referred to as "instantaneous disconnection") due to some reason. Operation of the monitoring circuit 43 in a case where an instantaneous disconnection occurs to the voltage of the DC power supply 61 is as follows.

When an instantaneous disconnection occurs in a case where power is supplied to the step-down power supply circuit 73 through the first power supply path L1, electric charge (power) stored in the capacitor 89 is supplied to the step-down power supply circuit 73. The step-down power supply circuit 73 operates due to the electric charge supplied from the capacitor 89. Therefore, operation of the rotation detection circuit 74 can be maintained temporarily.

When an instantaneous disconnection occurs in a case where power is supplied to the step-down power supply circuit 73 through the second power supply path L2, electric charge (power) stored in the capacitor 86 is supplied to the step-up/step-down power supply circuit 71. The step-up/step-down power supply circuit 71 operates due to the electric charge supplied from the capacitor 86. Therefore, operation of the step-down power supply circuit 73 and thus the rotation detection circuit 74 can be maintained temporarily.

Incidentally, when the voltage of the DC power supply 61 is at the normal level (when the voltage is not lowered), electric charge is accumulated in the capacitors 86 and 89.

By adjusting capacitance values of the capacitors 86 and 89, it is possible to adjust the time until the voltage supplied to the step-up/step-down power supply circuit 71 and the step-down power supply circuit 73 decreases to the minimum operating voltage. The capacitance of the capacitor 86 is set to a value larger than the capacitance of the capacitor 89. This is due to the number of power supply targets in a case where an instantaneous disconnection occurs. That is, in a case where an instantaneous disconnection occurs, the power supply target of the capacitor 89 is only the rotation detection circuit 74. On the other hand, power supply targets of the capacitor 86 are electric devices or electric circuits connected to the step-down power supply circuits $72_1$ to $72_n$.

<Effect of First Embodiment>

Therefore, according to the first embodiment, the following effects can be obtained.

(1) In a case where the power switch 63 of the vehicle is turned on, when lowering of the voltage of the DC power supply 61 is detected, the power supply path to the rotation detection circuit 74 is switched from the first power supply path L1 to the second power supply path L2. As a result, the voltage stepped up by the step-up/step-down power supply circuit 71 is supplied to the step-down power supply circuit 73 via the switch 85. The step-down power supply circuit 73 steps down the voltage stepped up by the step-up/step-down power supply circuit 71 to the voltage suitable for operation of the rotation detection circuit 74, and supplies the voltage stepped down to the rotation detection circuit 74. Therefore, even in a case where the voltage of the DC power supply 61 is lowered, the function of detecting rotation of the motor 31 is maintained.

(2) In a case where the power switch 63 of the vehicle is turned on, when an instantaneous disconnection occurs to the voltage of the DC power supply 61, the electric charge stored in the capacitor 86 is supplied to the step-up/step-down power supply circuit 71. Therefore, the operation of the step-up/step-down power supply circuit 71, the step-down power supply circuit 73, and the rotation detection circuit 74 is maintained temporarily. In a case where the power switch 63 of the vehicle is turned off, when an instantaneous disconnection occurs to the voltage of the DC power supply 61, the electric charge stored in the capacitor 89 is supplied to the step-down power supply circuit 73. Therefore, the operation of the step-down power supply circuit 73 and the rotation detection circuit 74 is maintained temporarily. Therefore, even in a case where an instantaneous disconnection occurs to the voltage of the DC power supply 61, the function of detecting rotation of the motor 31 is maintained.

(3) In a case where the power switch 63 of the vehicle is turned off, when lowering of the voltage of the DC power supply 61 is not detected (when the voltage of the DC power supply 61 is maintained at the normal level), the power of the DC power supply 61 is supplied to the step-down power supply circuit 73 (the rotation detection circuit 74) through the first power supply path L1. Since the step-up/step-down power supply circuit 71 does not need to operate, the power consumption of the DC power supply 61 can be suppressed accordingly.

Incidentally, a configuration in which power is constantly supplied to the step-down power supply circuit 73 (the rotation detection circuit 74) through the second power supply path L2 may also be adopted as the monitoring circuit 43. In this case, it is necessary to constantly supply the power generated by the step-up/step-down power supply circuit 71 to the step-down power supply circuit 73 that generates the operation power of the rotation detection circuit 74. However, even when the power switch 63 of the vehicle is turned off, it is necessary to operate the step-up/step-down power supply circuit 71. Therefore, although it is possible to cope with decrease in the voltage of the DC power supply 61, the power consumption of the DC power supply 61 is increased due to operation of the step-up/step-down power supply circuit 71.

(4) As compared with a case where a configuration in which power is constantly supplied to the step-down power supply circuit 73 (rotation detection circuit 74) via the second power supply path L2 is adopted as the monitoring circuit 43, the capacity of the capacitor 86 for instantaneous disconnection backup can be reduced. This is because that in the case where the configuration in which power is constantly supplied to the step-down power supply circuit 73 via the second power supply path L2 is adopted as the monitoring circuit 43, the power supplied by the capacitor 86 increases due to the step-down power supply circuit 73 (the rotation detection circuit 74) when an instantaneous disconnection occurs to the voltage of the DC power supply 61. Further, the capacitor 86, the monitoring circuit 43, and thus the ECU 40 can be reduced in size due to decrease in the capacitance of the capacitor 86.

Incidentally, in the case where the configuration in which power is constantly supplied to the step-down power supply circuit 73 (rotation detection circuit 74) via the second power supply path L2 is adopted as the monitoring circuit 43, since the voltage step-down power supply circuit 73 (rotation detection circuit 74) as a power supply target of the step-up/step-down power supply circuit 71, it is necessary to increase the capacity of the capacitor 86 for instantaneous disconnection backup. The capacitor 86 is increased in size due to increase in the capacitance, which increases the size of the monitoring circuit 43, and thus the ECU 40.

Second Embodiment

Next, a second embodiment of the rotation detection device will be described. This embodiment is different from the first embodiment in the configuration of the monitoring circuit 43.

Figure 4:
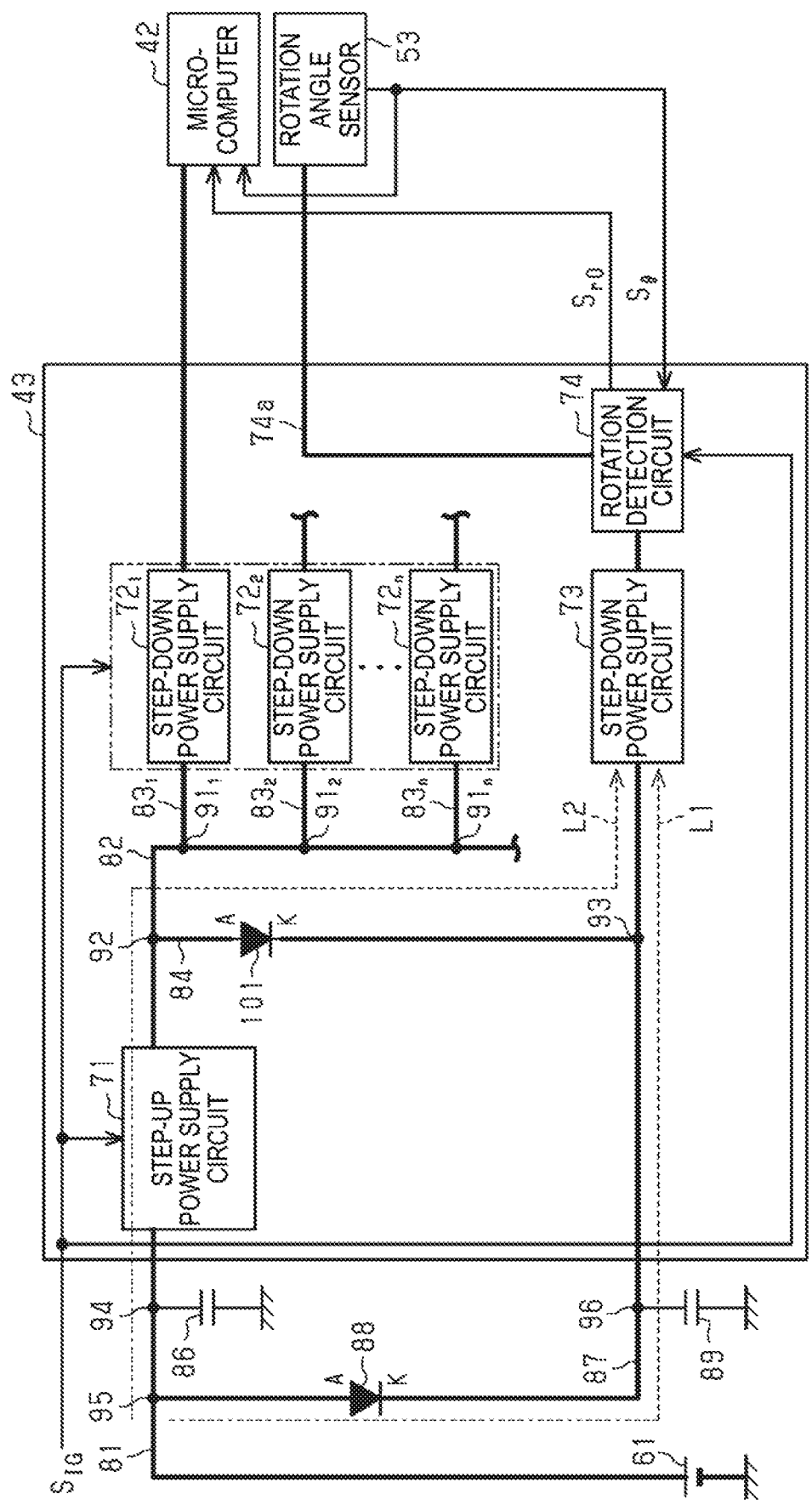
FIG. 4 is a block diagram of a monitoring circuit according to a second embodiment.

As shown in FIG. 4, the feeder 84 is provided with a diode 101 instead of the previous switch 85. An anode (A) of the diode 101 is connected to the connection point 92 side, and a cathode (K) is connected to the connection point 93 side.

The voltage detection circuit 75 and the switch control circuit 76 in the first embodiment are omitted.

<Function of Second Embodiment>

Next, a function of the second embodiment will be described. Here, the power switch 63 is turned on.

First, in a case where the voltage of the DC power supply 61 is not lowered (in a case where "Vb≥$V_{th}$"), the voltage of the DC power supply 61 is higher than the voltage generated by the step-up/step-down power supply circuit 71. That is, a voltage at the connection point 93 on the anode side of the diode 88 is higher than a voltage at the connection point 95 on the cathode side of the diode 88. Therefore, power from the DC power supply 61 is supplied to the step-down power supply circuit 73 through a first power supply path L1 indicated by a dashed arrow in FIG. 4. Incidentally, although the power from the DC power supply supplied through the first power supply path L1 at this time is to flow through the second power supply path L2 toward the step-up/step-down power supply circuit 71 side (the DC power supply 61 side), the current flow is regulated by the diode 101. The step-down power supply circuit 73 steps down the voltage supplied from the DC power supply 61 to a voltage suitable for operation of the rotation detection circuit 74, and supplies the voltage stepped down to the rotation detection circuit 74. The rotation detection circuit 74 operates by being supplied with the voltage generated by the step-down power supply circuit 73.

Next, in a case where the voltage of the DC power supply 61 is lowered below the voltage generated by the step-up/step-down power supply circuit 71, the voltage at the connection point 92 on the anode side of the diode 101 becomes higher than the voltage at the connection point 95 on the anode side of the diode 88. Therefore, the voltage generated by the step-up/step-down power supply circuit 71 is supplied to the step-down power supply circuit 73 through the second power supply path L2 indicated by the dashed line arrow in FIG. 4. Incidentally, although the power from the step-up/step-down power supply circuit 71 supplied through the second power supply path L2 at this time is to flow through the first power supply path L1 toward the DC power supply 61 side, the current flow is regulated by the diode 88. When the constant voltage generated by the step-up/step-down power supply circuit 71 is supplied to the step-down power supply circuit 73, the step-down power supply circuit 73 operates similarly as in the case where the voltage of the DC power supply 61 is not lowered. The rotation detection circuit 74 operates by being supplied with the voltage generated by the step-down power supply circuit 73.

In a case where an instantaneous disconnection occurs to the voltage of the DC power supply 61, similar as in the first embodiment, the electric charge (power) stored in the capacitor 86 is supplied to the step-up/step-down power supply circuit 71, and the electric charge (power) stored in the capacitor 89 is supplied to the step-down power supply circuit 73. The step-up/step-down power supply circuit 71 operates due to the power supplied from the capacitor 86. The step-down power supply circuit 73 operates due to the power supplied from the capacitor 89. Thus, the operation of the rotation detection circuit 74 is maintained temporarily.

<Effect of Second Embodiment>

Therefore, according to the second embodiment, in addition to the effects (1) to (4) in the first embodiment, the following effects can be obtained.

(5) In a case where the power switch 63 of the vehicle is turned on, when the voltage of the DC power supply 61 is lowered, the power supply path to the step-down power supply circuit 73 (the rotation detection circuit 74) is switched from the first power supply path L1 to the second power supply path L2. As a result, the voltage stepped up by the step-up/step-down power supply circuit 71 is supplied to the step-down power supply circuit 73 via the diode 101. Different from the first embodiment, a configuration in which the voltage detection circuit 75 that detects the voltage of the DC power supply 61 and the switch control circuit 76 that controls the switch 85 are omitted may be adopted as the monitoring circuit 43. Therefore, the configuration of the monitoring circuit 43 can be simplified.

Other Embodiments

The first and second embodiments may be modified as follows.

The step-up/step-down power supply circuit 71 may generate a voltage of the same level as the normal level of the DC power supply 61 as a constant voltage (target value of voltage). The step-up/step-down power supply circuit 71 may be configured as a step-up power supply circuit. In a case where the vehicle power supply is turned on (in a case where the electric signal $S_{IG}$ indicates the ON state of the power switch 63), the step-up/step-down power supply circuit 71, which is a step-up power supply circuit, operates when the voltage of the DC power supply 61 is lowered below the normal level, and performs at least the step-up operation so that the voltage of the DC power supply 61 is maintained at the normal level.

In a case where a configuration in which power is supplied from a power supply other than the monitoring circuit 43 to the microcomputer 42, the torque sensor 52, and the CAN transceiver according to the specifications of the EPS 10 or the ECU 40 is adopted, a configuration in which the step-down power supply circuits $72_1$ to $72_n$ are omitted according to the number of power supply targets may be adopted as the monitoring circuit 43. In a case where all of the step-down power supply circuits $72_1$ to $72_n$ are omitted, the step-up/step-down power supply circuit 71 is present only to supply power to the step-down power supply circuit 73 in a case where the voltage of the DC power supply 61 is lowered in a state in which the power switch 63 of the vehicle is turned on.

The steering angle $\theta_s$ (absolute angle) calculated by the microcomputer 42 may be used not only in the EPS 10 but also in a control device of another in-vehicle system. Examples of the other in-vehicle system include a vehicle stability control system and various driving support systems.

In the first and second embodiments, a configuration that executes compensation control based on the steering angle $\theta_s$ is adopted as the microcomputer 42, whereas a configuration that does not execute the compensation control based on the steering angle $\theta_s$ depending on product specifications or the like may be adopted as well. The ECU 40 or the microcomputer 42 may have a function of calculating the steering angle $\theta_s$ even in this case. The steering angle $\theta_s$ may be used in another in-vehicle system even when not used in the EPS 10.

In the first and second embodiments, the EPS 10 is exemplified as a type that transmits the torque of the motor 31 to the steering shaft 22 (the column shaft 22a) is taken as an example, but may also be a type that transmits the torque of the motor 31 to the rack shaft 23.

In the first and second embodiments, the vehicle control device is embodied as the ECU 40 of the EPS 10, but may also be embodied as a control device of a steer-by-wire (SBW) type steering device having a clutch function that connects and disconnects a power transmission path between a steering wheel and steered wheels. In a state in which the power transmission path between the steering wheel and the steered wheels is connected, the SBW type steering device has the same problem as that of the EPS 10. Further, the vehicle control device may be embodied as a control device of a steer-by-wire type steering device in which power transmission between the steering wheel and the steered wheels is separated. Even in a case where a configuration without a clutch function that connects and disconnects power transmission between the steering wheel and the steered wheels is adopted as the steer-by-wire type steering device, the same problem as that of the EPS 10 occurs when the steering angle $\theta_s$ or the steering angle $\theta_w$ is detected.

What is claimed is:

1. A rotation detection device comprising:
   a rotation detection circuit including a first diode and a second diode, the rotation detection circuit being configured to detect a number of rotations of a motor that generates a torque applied to a steering mechanism of a vehicle, based on an electric signal, the electric signal being generated according to a rotation angle of the motor acquired through an in-vehicle sensor;
   a step-up power supply circuit configured to perform a step-up operation so that a voltage of a DC power supply mounted in the vehicle is maintained at a normal level, when a vehicle power supply is turned on and the voltage of the DC power supply is lowered below the normal level;
   a step-down power supply circuit connected to the DC power supply, the step-down power supply circuit being configured to perform a step-down operation to an operational voltage to operate the rotation detection circuit;
   a first power supply path connecting the DC power supply and the step-down power supply circuit, the first power supply path supplying power to the step-down power supply circuit, when the vehicle power supply is turned on and the voltage of the DC power supply is maintained at the normal level, and the first diode has an anode provided on a DC power supply side and the first diode has a cathode provided on a step-down power supply side, in the first power supply path; and
   a second power supply path connecting the step-up power supply circuit and the step-down power supply circuit, the second power supply path supplying power to the step-down power supply circuit, when the vehicle power supply is turned on and the voltage of the DC power supply is lowered below the normal level, wherein:
      an input side at connection points of the step-up power supply circuit is connected to a positive terminal of the DC power supply, and an output side at the connection points of the step-up power supply circuit is connected to the second power supply path,
      the first power supply path and the second power supply path are integrated at a step-down power supply circuit side, and
      the second diode has an anode provided on a step-up power supply circuit side and the cathode is provided on the step-down power supply circuit side, in the second power supply path.

2. The rotation detection device according to claim 1, further comprising:
   a voltage detection circuit configured to detect the voltage of the DC power supply;
   a switch provided in the second power supply path and configured to open and close the second power supply path; and
   a switch control circuit configured to control opening and closing of the switch,
      wherein the switch control circuit maintains the switch in an open state, when the vehicle power supply is turned on and the voltage of the DC power supply detected through the voltage detection circuit is equal to or higher than a threshold voltage set based on an operable voltage of the step-down power supply circuit, and
      wherein the switch control circuit switches the switch from the open state to a closed state, when the vehicle power supply is turned on and the voltage of the DC power supply is lower than the threshold voltage.

3. The rotation detection device according to claim 1, wherein:
   the rotation detection device includes a first capacitor for instantaneous disconnection backup in the first power supply path and between the DC power supply and the step-down power supply circuit, and
   the rotation detection device includes a second capacitor for instantaneous disconnection backup in the second power supply path and between the DC power supply and the step-up power supply circuit.

4. The rotation detection device according to claim 1, wherein:
   the step-up power supply circuit is configured to stop operation when the vehicle power supply is turned off, and configured to generate a constant voltage by switching the step-up operation and the step-down operation according to the voltage of the DC power supply when the vehicle power supply is turned on,
   the rotation detection device includes a second step-down power supply circuit configured to stop operation when the vehicle power supply is turned off, and configured to lower a voltage generated by the step-up power supply circuit to a suitable voltage for another power supply target except for the rotation detection circuit when the vehicle power supply is turned on, and
   the voltage generated by the step-up power supply circuit is supplied to the second step-down power supply circuit through a third power supply path other than the first power supply path and the second power supply path when the vehicle power supply is turned on.

* * * * *